US006720964B1

(12) United States Patent
Fowler et al.

(10) Patent No.: US 6,720,964 B1
(45) Date of Patent: Apr. 13, 2004

(54) METHOD AND APPARATUS FOR PROCESSING PORTIONS OF PRIMITIVES THAT ARE BEING RENDERED

(75) Inventors: Mark C. Fowler, Hopkinton, MA (US); Stephen Morein, Cambridge, MA (US); Andi Skende, Shrewsbury, MA (US); Kevin M. Olson, Marlboro, MA (US)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/457,648

(22) Filed: Dec. 9, 1999

Related U.S. Application Data

(63) Continuation-in-part of application No. 09/140,930, filed on Aug. 27, 1998, now Pat. No. 6,492,987.

(51) Int. Cl.$^7$ .............................................. G06T 15/40
(52) U.S. Cl. ..................................................... 345/422
(58) Field of Search ................................ 345/421, 422, 345/424, 426, 427, 441, 620, 629; 382/270, 309; 358/3.03

(56) References Cited

U.S. PATENT DOCUMENTS

| 4,748,572 A | * | 5/1988 | Latham ....................... 345/422 |
| 4,855,938 A | | 8/1989 | Gonzalez-Lopez et al. |
| 5,268,995 A | | 12/1993 | Diefendorff et al. |

(List continued on next page.)

FOREIGN PATENT DOCUMENTS

| GB | 2301513 A | 11/1995 |
| WO | WO 00/70561 | 11/2000 |

OTHER PUBLICATIONS

"Hierarchical Polygon Tiling with Coverage Masks," Greene; Computer Graphics Proceedings, 1996, pp. 65–74.

"Hierarchical Z–Buffer Visibility," Greene; Computer Graphics Proceedings, 1993, pp. 231–238.

European Search Report, Nov. 15, 2002.

Greene et al., Hierarchical Z–Buffer Visibility, Computer Graphics Proceedings, Aug. 1–6, 1993, pp. 231–236.

Zhang et al., Visibility Culling using Hierarchial Occlusion Maps, Aug. 3–8, 1997, pp. 77–88.

*Primary Examiner*—Mark Zimmerman
*Assistant Examiner*—Lance W. Sealey
(74) *Attorney, Agent, or Firm*—Vedder, Price, Kaufman & Kammholz, P.C.

(57) ABSTRACT

A method and apparatus for processing portions of primitives that are being rendered is presented. Primitives that are received are divided into portions that correspond to pixel blocks of the frame. The frame includes a plurality of pixel blocks where each of the pixel blocks includes a plurality of pixels that are included in the frame. Thus, the pixel blocks divide the frame into a number of smaller blocks. A representative Z value for each portion of the primitive is determined, and the representative Z value for the portion of the primitive is compared with a representative buffered Z, which may be the representative buffer Z value for the pixel block to which the portion corresponds. If the representative Z value for the portion compares favorably with the representative buffered Z value such that the portion is determined to lie completely behind the information currently stored for that pixel block, the portion is discarded. If the representative Z value for the portion compares with the representative buffer Z value in such a way that not all of the portion is ensured of being positioned behind currently buffered data for the pixel block, the portion of the primitive is processed further such that pixel fragments corresponding to the portion are generated and combined with the information currently stored for that pixel block. The representative buffered Z values for each of the pixel blocks may be derived based on a compression scheme applied to the Z values for each of the individual pixel blocks.

26 Claims, 3 Drawing Sheets

U.S. PATENT DOCUMENTS

| | | | |
|---|---|---|---|
| 5,402,506 A | * | 3/1995 | Schafer .................. 382/270 |
| 5,522,018 A | | 5/1996 | Takeda et al. |
| 5,701,405 A | | 12/1997 | Kelley et al. |
| 5,734,806 A | | 3/1998 | Narayanaswami |
| 5,760,780 A | | 6/1998 | Larson et al. |
| 5,819,017 A | | 10/1998 | Akeley et al. |
| 5,864,342 A | | 1/1999 | Kajiya et al. |
| 5,870,095 A | * | 2/1999 | Albaugh et al. ............ 345/422 |
| 5,870,097 A | * | 2/1999 | Snyder et al. ............. 345/426 |
| 5,977,980 A | | 11/1999 | Aleksicy |
| 5,977,987 A | * | 11/1999 | Duluk, Jr. .................. 345/441 |
| 5,982,376 A | | 11/1999 | Abe et al. |
| 6,014,143 A | * | 1/2000 | Naqvi et al. ................ 345/424 |
| 6,037,946 A | | 3/2000 | Takeda |
| 6,084,591 A | | 7/2000 | Aleksic |
| 6,160,557 A | | 12/2000 | Narayanaswami |
| 6,246,415 B1 | * | 6/2001 | Grossman et al. .......... 345/422 |

* cited by examiner

METHOD AND APPARATUS FOR PROCESSING PORTIONS OF PRIMITIVES THAT ARE BEING RENDERED

RELATED APPLICATIONS

This application is a continuation in part of application Ser. No. 09/140,930 filed on Aug. 7, 1998 entitled "METHOD AND APPARATUS FOR PROCESSING OBJECT ELEMENTS THAT ARE BEING RENDERED."

FIELD OF THE INVENTION

The invention relates generally to video graphics processing and more particularly to a method and apparatus for processing portions of primitives that are being rendered.

BACKGROUND OF THE INVENTION

Computers are used in many applications. As computing systems continue to evolve, the graphical display requirements of the systems become increasingly demanding. This is especially true in the area of three-dimensional (3D) graphics processing. In order to process 3D graphics images, the position of graphics primitives with respect to the display must be understood in all three dimensions. This includes the dimension of depth, often referred to as the Z dimension. The Z dimension describes the positioning of a video graphics primitive with respect to other video graphics primitives within the display frame in terms of depth, or distance from the viewer, of the video graphics primitives.

Computer displays and other high resolution display devices such as high definition televisions (HDTVs), projectors, printers, plotters, and the like, present an image to the viewer as an array of individual picture elements, or pixels. The individual pixels are given a specific color, which corresponds to the color of the image at the location of the particular pixel. The pixels are closely spaced, and the viewers visual system performs a filtering of the individual colors to form a composite image. If the partitioning of the image into individual pixel elements is performed properly, and the pixels are close enough together, the viewer perceives the displayed array of pixels as a virtually continuous image.

In order to present a smooth and continuous image on the display, the processing entity processing the video graphics images must maintain a high rate of pixel processing. In many cases, graphics primitives that are received for rendering are often inconsequential as they are positioned behind other primitives or objects already drawn with respect to the display frame. In other words, the information contained within the graphics primitive is completely covered up from a viewer's perspective by other graphics primitives as the Z dimension of the newly received primitive positions it behind those primitives already drawn. As such, the processing operations required for processing such inconsequential primitives may be unnecessary.

In some prior art systems, a number of hierarchical sets of Z values are stored for a display frame. For example, the rear most Z value for each half of the display may be stored in one set, the rear most value for each quarter in the next hierarchical set, the rear most value for each eighth in the next, etc. As such, primitives can be compared with successive hierarchical layers to determine if the primitive needs to be rendered. In such prior art systems, the front must portion of the primitive in question is compared with the rear most portion of each relevant hierarchical layer. If the primitive is determined to lie behind other primitives based on the hierarchical layer comparisons, the entire primitive may be discarded. If any portion of the primitive is determined to lie in a potentially visible position, the entire primitive is rendered. The full set of hierarchical layers, which may be stored as an octal tree, requires a large amount of overhead, and recomputation of the hierarchical layers after each primitive rendering operation requires additional processing bandwidth. In addition, by rendering or discarding entire primitives based on the comparison with the current state of the frame, if only a small portion of the primitive is potentially visible and therefore needs to be processed, processing of the remaining portions that are not potentially visible consumes processing resources unnecessarily.

Therefore, a need exists for a method and apparatus that allows primitives to be processed in a more efficient manner that avoids at least some unnecessary processing of non-visible primitive portions without the need for storing hierarchical sets of Z values.

DETAILED DESCRIPTION OF A PREFERRED EMBODIMENT OF THE INVENTION

Generally, the present invention provides a method and apparatus for processing portions of primitives that are being rendered. Primitives, which may also be referred to as object elements, that are received are divided into portions that correspond to pixel blocks of the frame. The frame includes a plurality of pixel blocks where each of the pixel blocks includes a plurality of pixels that are included in the frame. Thus, the pixel blocks divide the frame into a number of smaller blocks. A representative Z value for each portion of the primitive is determined, and the representative Z value for the portion of the primitive is compared with a representative buffered Z, which may be the representative buffer Z value for the pixel block to which the portion corresponds. If the representative Z value for the portion compares favorably with the representative buffered Z value such that the portion is determined to lie completely behind the information currently stored for that pixel block, the portion is discarded. If the representative Z value for the portion compares with the representative buffer Z value in such a way that not all of the portion is ensured of being positioned behind currently buffered data for the pixel block, the portion of the primitive is processed further such that pixel fragments corresponding to the portion are generated and combined with the information currently stored for that pixel block. The representative buffered Z values for each of the pixel blocks may be derived based on a compression scheme applied to the Z values for each of the individual pixel blocks. As such, generation of the representative buffer Z values can be performed with minimal additional overhead.

By allowing portions of graphics primitives to be processed individually and discarded when determined to be irrelevant, the processing of numerous unnecessary video graphics primitive portions can be avoided. As such, the processing bandwidth available for performing relevant processing operations is increased, thus improving overall system performance. When utilized in a system that also includes Z compression on a pixel block basis, the additional overhead associated with storing representative buffer Z values for each of the pixel blocks within the display frame is reduced.

Figure 1:
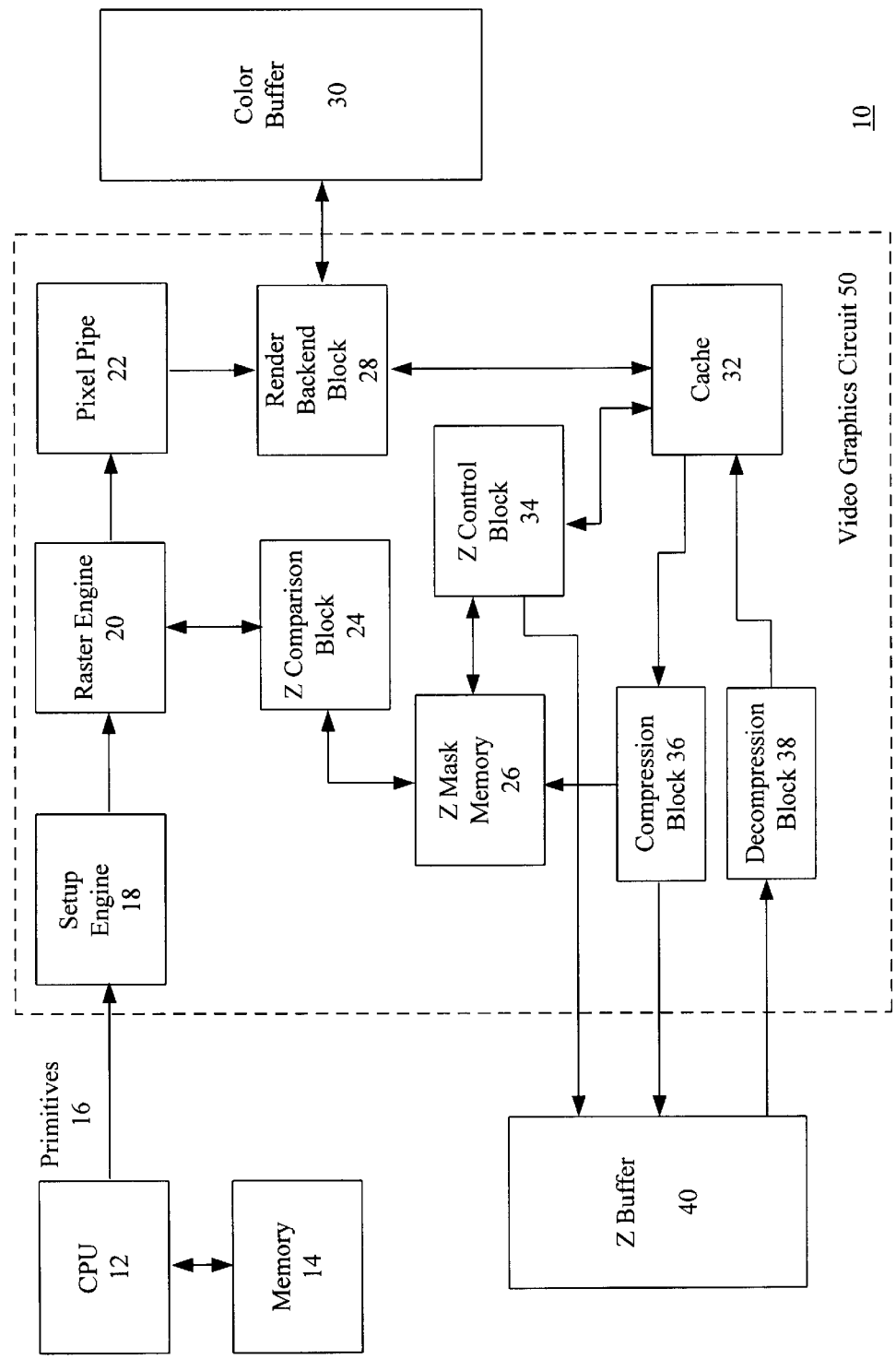
FIG. 1 illustrates a block diagram of a video graphics processing circuit in accordance with a particular embodiment of the present invention.

The invention can be better understood with reference to FIGS. 1–5. FIG. 1 illustrates a block diagram of a circuit 10 that includes a central processing unit (CPU) 12, system memory 14, a video graphics circuit 50, a color buffer 30, and a Z buffer 40. The CPU 12 and system memory 14 may be a CPU and system memory as found in a personal computer, workstation, handheld computer, laptop computer, or any similar type of computing device. The Z buffer 40 stores buffered Z data, where the buffered Z data may be in a compressed format as will be described below. The Z buffer stores a buffered Z data value for each pixel in a frame. Similarly, the color buffer 30 stores a color value for each pixel within the frame, where the information in the color buffer may be used to generate a display output for driving a display device to provide images to a viewer.

The video graphics circuit 50 includes a set up engine 18, a raster engine 20, a pixel pipe 22, a render backend block 28, and additional blocks associated with the storage of Z values in a compressed format. Although the specific example described with respect to FIG. 1 includes the compression of the Z information to determine representative buffered Z values for pixel blocks in a frame, such representative buffered Z values may be determined without any Z compression occurring. Calculation of the representative buffered Z values for pixel blocks may be performed using a number of techniques that will be readily apparent to one of ordinary skill in the art.

The Z compression circuitry shown to be included in the circuit 10 of FIG. 1 may be substantially similar to that described in detail in a co-pending patent application Ser. No. 09/369,730, entitled "METHOD AND APPARATUS FOR CONTROLLING COMPRESSED Z INFORMATION IN A VIDEO GRAPHICS SYSTEM" (hereinafter "Z Compression Application") and having a filing date of Aug. 6, 1999, which is incorporated herein by reference. The Z compression circuitry is shown to include a cache 32, a Z control block 34, a Z mask memory 26, a compression block 36, a decompression block 38, and the Z buffer 40, which is assumed to store Z data where at least some of the Z data is stored in a compressed format.

As is described in the Z Compression Application, pixels in the display frame are separated into a plurality of pixel blocks where each pixel block includes a plurality of pixels: The Z information corresponding to the plurality of pixels in each pixel block is compressed and stored in the Z buffer 40 in a compressed format when possible. A Z mask value is stored for each pixel block to indicate the level of compression of the Z information for that pixel block in the Z buffer 40. The Z mask value may include a N-bit compression level encoding, where the encoding provides $2^N$ potential levels. The Z mask value in the embodiment shown in FIG. 1 also preferably includes the representative buffered Z value for that pixel block such that such a representative buffered Z value can be readily determined by other blocks within the circuit 10.

When Z information for a pixel block is required in an uncompressed format for processing operations, the cache 32 is first examined to determine if the Z information is currently stored in the cache 32. If it is not, the Z mask memory 26 is consulted by the Z control block 34 to determine the level of compression of the Z information for that particular pixel block in the Z buffer 40. Knowing the level of compression enables the Z control block 34 to only fetch the appropriate amount of data required from the Z buffer 40 which is then provided to the decompression block 38 for decompression and storage in the cache 32 for use.

When Z information stored in the cache 32 is flushed and the data in the Z buffer 40 must be updated (i.e. the cache is flushing a modified copy), the compression block 36 attempts to compress the Z data prior to storage in the Z buffer 40. Based on the level of success in compression, the compression block 36 stores the level of compression as part of the Z mask value for that pixel block in the Z mask memory 26. In addition, the compression block 36 determines a representative buffered Z value for the pixel block, which it also includes in the Z mask value stored in the Z mask memory 26 for that pixel block.

Preferably, the representative buffered Z value for each pixel block as determined by the compression block 36 is the rear most Z value of all the pixels within that particular pixel block. As stated earlier, although the benefits of compressing the Z information in a video graphics system compliment the reduction in processing resources required as provided by the individual processing of portions of primitives as described herein, the compression of Z data is not required for determining a representative buffered Z value for a pixel block. In other words, a block other than the compression block 36 may be used to determine the rear most Z value for the pixels included in a pixel block which is then stored in a memory structure as the representative buffered Z value for that particular pixel block.

To briefly summarize the Z compression circuitry, the cache 32 stores uncompressed Z information for use by the render backend block 28 and possibly other blocks included in the system. The Z control block 34, which is operably coupled to the render backend block 28, the cache 32, the Z buffer 40, and the Z mask memory 26 controls caching of buffered Z data for use by the render backend block 28 based on the compression levels as stored in the Z mask memory 26. The decompression block 38, which is operably coupled to the cache 32 and the Z buffer 40, decompresses buffered Z data received from the Z buffer 40 to produce stored Z data in the uncompressed format for storage in the cache. The compression block 36, which is operably coupled to the Z buffer 40, the Z mask memory 26, and the cache 32 compresses stored Z data for pixel blocks received from the cache 32 to produce buffered Z data for storage in the Z buffer 40. Through this compression operation, the compression block 36 determines a compression level and a representative buffered Z value for each pixel block, which the compression block 36 then stores in the Z mask memory 26.

The compression algorithm used by the compression block 36 and also used for decompression by the decompression block 38 may be a compression algorithm as is described in a co-pending patent application Ser. No. 09/387,870 entitled "METHOD AND APPARATUS FOR COMPRESSING PARAMETER VALUES FOR PIXELS IN A DISPLAY FRAME", which has a filing date of Sep. 1, 1999 and is incorporated herein by reference.

Figure 2:
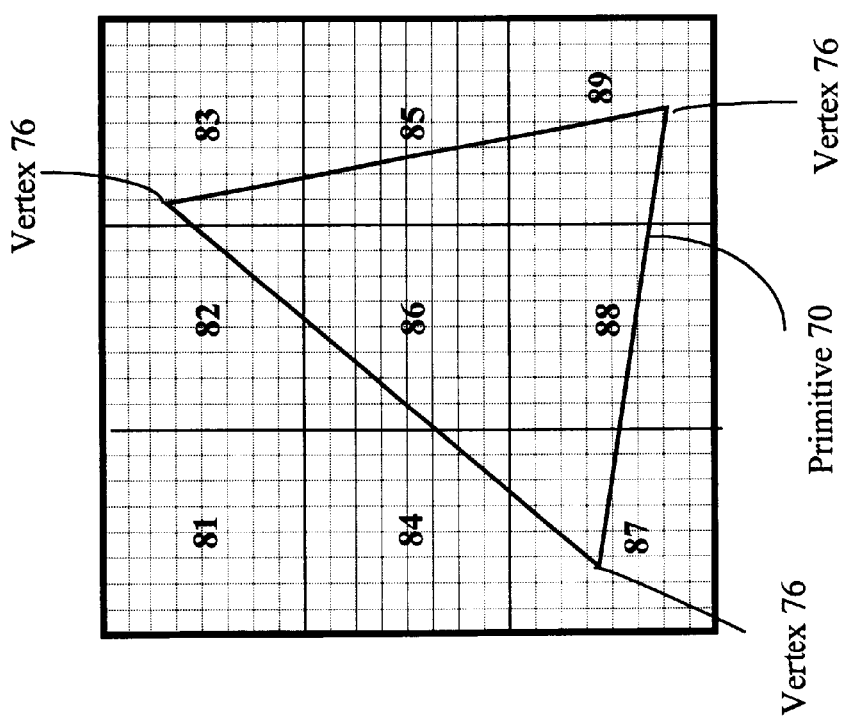
FIG. 2 is a graphical representation of primitive as it relates to a plurality of pixel blocks in a display frame.

In operation, when the CPU 12, which may be executing software stored in system memory 14, generates video graphics primitives 16 for display, the set up engine 18 produces primitive slope information based on received graphics primitives 16. Preferably, the graphics primitives 16 are triangle primitives that include information regarding the values of various parameters at the vertices of the primitive. Slope information corresponding to the primitives 16 is provided to the raster engine 20, which is operably coupled to the set up engine 18. The raster engine 20 processes the primitives 16 in a manner that, depending on the size of the primitive, may divide each primitive into a number of separate portions. The division or separation is performed such that each of the portions corresponds to a pixel block division within the display frame. For example, if a video graphics primitive covers portions of seven pixel blocks, which is illustrated in FIG. 2, the coordinates of the vertices of the primitive will indicate such coverage. Knowing the coordinates corresponding to each of the individual pixel blocks which the display frame has been divided into allows the primitive to be separated into a number of separate portions, where each portion of the primitive corresponds to the portion of the primitive that overlaps a particular pixel block. The raster engine 20 can be designed such that the separate processing of each primitive portion is inherent to the processing technique and therefore is not an additional step that requires complex or bandwidth consuming calculations.

The raster engine 20 utilizes the received primitive slope information, which is included in a number of primitive parameters (object element parameters) corresponding to the primitive, and determines representative Z information for each portion of the primitive. In one embodiment, the representative Z information for each portion of the primitive is the front most Z value for the primitive as a whole. In another embodiment, the front most Z value for each portion may be calculated based on at least a portion of the primitive parameters, or pixel slope information, for the primitive as received from the set up engine 18. The representative Z information for each portion is provided to the Z comparison block 24 that is operably coupled to the raster engine 20 and the Z mask memory 26.

The Z comparison block 24 compares the representative Z information for each portion with a representative buffered Z value for a corresponding pixel block, where the representative buffered Z values are preferably stored in the Z mask memory 26 as described above.

In order to simplify the performance of multiple comparison operations for a particular primitive, the representative buffered Z value for a pixel block may be determined in a coarse manner such that a single representative buffered Z value is used for comparison with all of the portions of a particular primitive. FIG. 2 illustrates an coarse technique for determining a representative buffered Z value for a pixel block.

FIG. 2 illustrates a primitive 70 that overlays (corresponds to) a number of pixel blocks 82–89. As is illustrated, each of the pixel blocks 81–89 is an 8 pixel-by-8 pixel block that includes 64 pixels. As is apparent to one of ordinary skill in the art, the number of pixels included in a pixel block and the general configuration of the pixel block may vary from one application to the next. Thus, the pixel block need not necessarily by square or rectangular in shape and may contain more or fewer pixels.

The pixel blocks that correspond to the primitive 70 are determined based on the vertices 76 of the primitive 70. The vertices 76 determine the physical coordinates of the primitive 70 within the display frame. In the example illustrated in FIG. 2, a set of pixel blocks 81–89 is determined based on the location of the vertices 76. Thus, the left most vertex determines a left most coordinate, the top most vertex determines a top most coordinate, the right most vertex determines a right most coordinate, and a bottom most vertex determines a bottom most coordinate. Based on these four coordinates, a rectangular set of pixel blocks is determined. The representative buffered Z value for all of the pixel blocks included within the selected set of pixel blocks 81–89 is then determined based on the rear most Z value included in any one of those pixel blocks 81–89 included in the set determined by the position of the vertex of 76. Note that this type of a determination corresponds to the example illustrated in FIG. 2, and additional techniques are described below.

Figure 3:
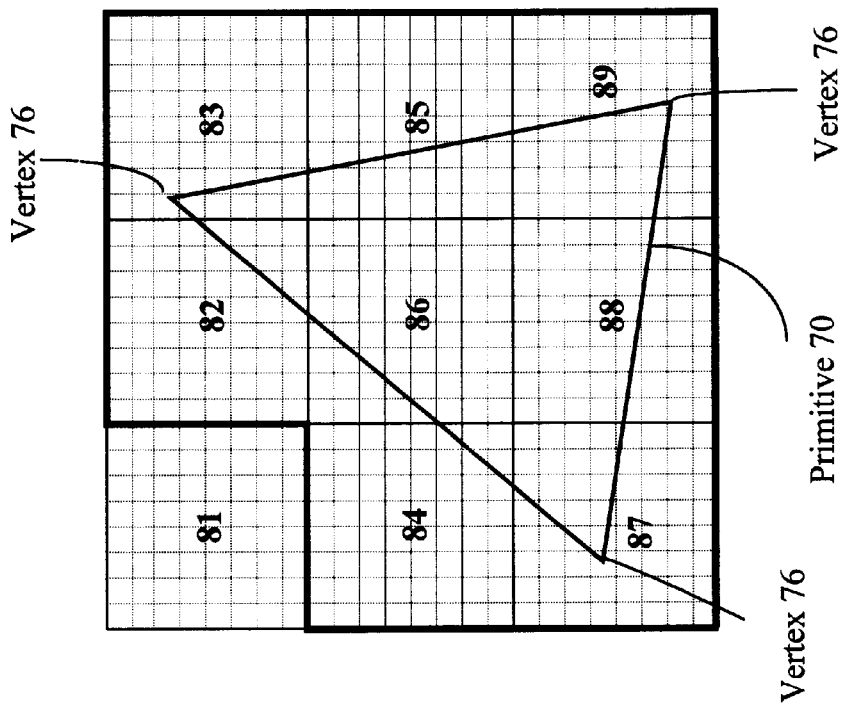
FIG. 3 illustrates an alternate graphical representation of a primitive as it relates to a plurality of pixel blocks included in a display frame.

In another embodiment, only those pixel blocks that correspond to the primitive 70 (i.e. those pixel blocks that include pixels for which information is contained within the primitive 70) are included in the set of pixel blocks used to determine the representative buffered Z value that is to be used for all of the pixel blocks when determining whether or not to further process the various portions of the primitive 70. FIG. 3 illustrates such an embodiment in which only those pixel blocks 82–89 that are shown to be overlapped by the primitive 70 are considered relevant. The pixel block 81, which was included in the set of pixel blocks used for determining the representative buffered Z value in FIG. 2 is not considered in the representative buffered Z value determination in the embodiment of FIG. 3.

In another embodiment, the representative buffered Z value for each pixel block is determined on a pixel block basis for comparison with the representative Z value for each portion of the object element, or primitive. This may be preferred when Z data compression is also included in the system, which is the case for the circuit 10 of FIG. 1. In the circuit 10 of FIG. 1, the representative buffered Z value for each pixel block is readily determined from the Z mask values stored in the Z mask memory 26. As stated earlier, each Z mask value within the Z mask memory 26 corresponds to a particular pixel block and includes a representative buffered Z value for the pixel block along with the compression level of the Z information for that pixel block.

Based on the comparison between the representative Z information for each portion of the primitive with the representative buffered Z value for the corresponding pixel block, the Z comparison block generates an indication that it provides to the raster engine 20. The indication provided to the raster engine 20 indicates either a favorable or an unfavorable comparison. Preferably, a favorable comparison indicates that the portion of the primitive has been determined to lie completely behind the currently stored information for the pixel block to which the portion corresponds. Thus, performing any additional processing of that portion of the primitive would cause no change to the information stored for the display frame. As such, the additional processing is unnecessary, and the raster engine 20 can discard that portion of the primitive.

In the case where an unfavorable comparison is determined by the comparison block 24, this determination may indicate that, according to the coarse comparison performed, the portion of the primitive is not ensured to lie entirely behind the information stored for that pixel block. As such, processing that portion of the primitive continues.

Thus, the Z comparison block 24 compares the representative Z values of various portions of the primitive with representative buffered Z values stored for the corresponding pixel blocks. In one embodiment, the comparison is based on the front most Z value of the portion of the primitive and the rear most Z value stored for any pixel within the pixel block. Thus, the comparison is a somewhat coarse determination as to whether the portion of the primitive will have any relevance to that particular pixel block. Such a course comparison enables obviously non-visible portions of primitives to be discarded rather than requiring processing resources to be expended unnecessarily.

The continued processing performed by the raster engine 20 for each portion of each primitive includes the generation of pixel fragments from the primitive slope information provided by the set up engine 18. Preferably, each pixel fragment includes a color value, a set of coordinates indicating a pixel in the display frame to which the fragment corresponds, and a Z value for the fragment. Note that the processing steps performed by the raster engine 20 may be divided such that two different blocks perform different portions of the functions. Thus, one block could determine the representative Z value for various portions, whereas the other block generates pixel fragments for portions that are determined to be relevant based on the Z comparison performed by the Z comparison block 24. This may further improve the efficiency of the system as such operations could be performed in parallel and may be pipelined to improve throughput.

The pixel pipe 22, which is operably coupled to the raster engine 20, performs various operations that may modify the color of the pixel fragments as received from the raster engine 20. Such operations can include texture mapping operations. The textured fragments resulting from the operations performed by the pixel pipe 22 are then passed to the render backend block 28.

The render backend block 28 blends textured fragments with data for corresponding pixels as stored in the color buffer 30 and the Z buffer 40. As discussed earlier, the inclusion of the Z compression circuitry is optional, and therefore the render backend block 28 may interact directly with the Z buffer 40 in other implementations. In the embodiment illustrated in FIG. 1, the render backend block 28 fetches relevant Z information from the cache 32. The Z value for each textured fragment is used to blend the fragment with the currently stored pixel information. The blending operations performed by the render backend block 28 are well known in the art, and the resulting pixel information produced by the backend block 28 is stored back in the color buffer 30 and the Z buffer 40 (possibly via the cache 32).

Preferably, the video graphics circuit 50 is implemented as a single integrated circuit. In other embodiments, the Z mask memory 26 may be implemented as an off-chip memory supported by an on-chip cache. In order to reduce the required size of the Z mask memory 26, the representative buffered Z values for the pixel block may be a truncated Z values. Thus, only a most significant portion of the actual Z value may be stored as the representative buffered Z value. Although this increases the coarseness of the comparisons performed by the Z comparison block 24, it can provide some level of relevancy determination with respect to the various portions of primitives.

Figure 4:
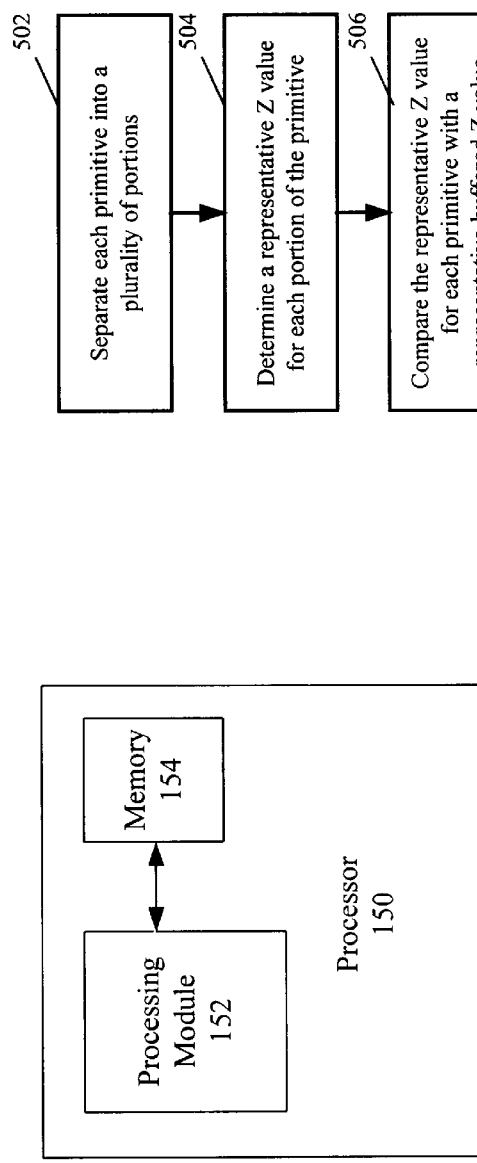
FIG. 4 illustrates a block diagram of a video graphics processor in accordance with a particular embodiment of the present invention.

FIG. 4 illustrates a video graphics processor 150 that may be used for processing primitives corresponding to a frame in a video graphics circuit. The processor 150 includes a processing module 152 and memory 154. The processing module 152 may include a single processing entity or a plurality of processing entities. Such a processing entity may be microprocessor, microcontroller, digital signal processor, state machine, logic circuitry, or any device that processes information based on operational or programming instructions.

The memory 154 may be a single memory device or a plurality of memory devices. Such a memory device may be a read only memory device, random access memory device, floppy disk, hard drive memory, or any device that stores digital information. Note that when the processing module 152 has one or more of its functions performed by a state machine or logic circuitry, the memory containing the corresponding operational instructions may be embedded within the state machine or logic circuitry.

Figure 5:
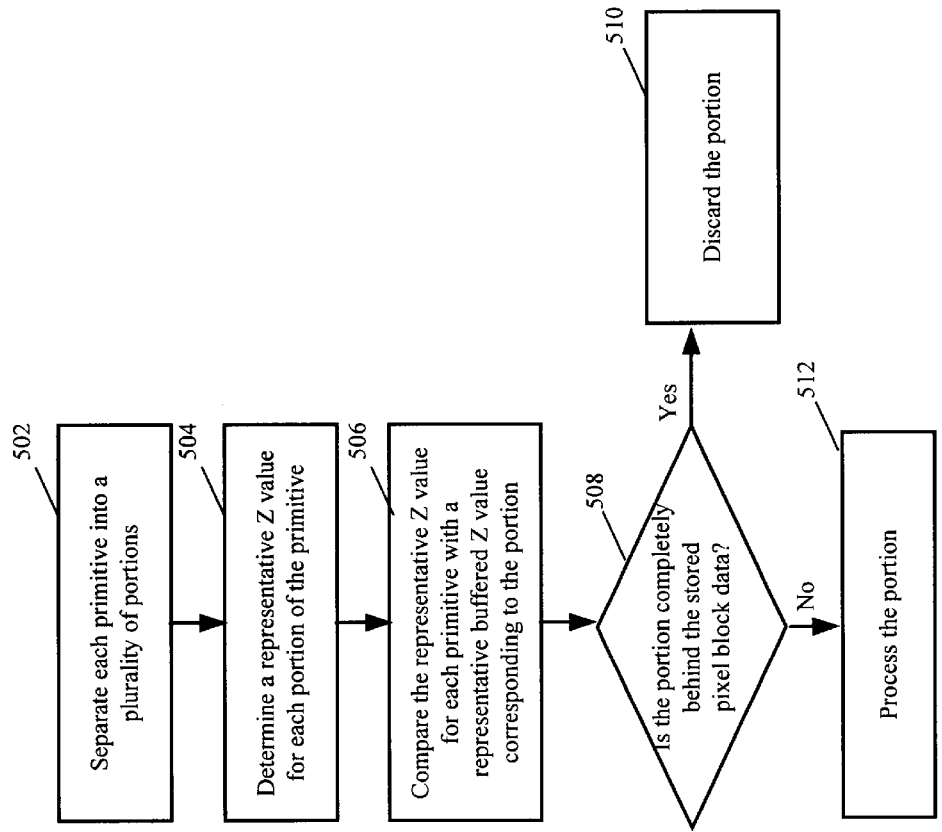
FIG. 5 illustrates a flow diagram of a method for processing primitives corresponding to a frame in accordance with a particular embodiment of the present invention.

The memory 154 stores programming or operational instructions that, when executed, allow the processing module 152 to perform at least a portion of the method illustrated in FIG. 5. Note that the processor 150 may implement some of the functions of FIG. 5 through software stored in the memory 154, whereas other portions may be implemented using hardware, or circuitry included within the processor 150. Thus, in some embodiments, a mix of hardware and software may be used to perform the method illustrated in FIG. 5.

FIG. 5 illustrates a method for processing primitives corresponding to a frame. The method begins a step 502 where each primitive is separated into a plurality of portions. Each portion of the plurality of portions corresponds to a pixel block of a plurality of pixel blocks where each pixel block includes a portion of a set of pixels that makes up the frame.

At step 504, a representative Z value for each portion of the primitive is determined. In one embodiment, the representative Z value for each portion of the primitive is determined by utilizing a front most Z value for the primitive as the representative Z value for all portions of the primitive. In another embodiment, determining the representative Z value for each portion of the primitive includes calculating a front most Z value for each portion of the primitive. Such calculations may be performed based on the Z values indicated for the vertices of the primitive.

At step 506, the representative Z value for each portion is compared with a representative buffered Z value corresponding to the portion. In one embodiment, the representative buffered Z value corresponding to the portion is a Z value corresponding to a rear most pixel block in a rectangular set of pixel blocks determined by the vertices of the primitive. Such an embodiment was described with respect to FIG. 2 above. In another embodiment, the representative buffered Z value is a Z value corresponding to a rear most pixel block in a set of pixel blocks that include pixel blocks that include pixels to which the primitive corresponds. Such an embodiment was described with respect to FIG. 3 above.

In other embodiments, the representative buffered Z value for the portion is the representative buffered Z value for the pixel blocks to which the portion corresponds, where the representative buffered Z value is stored in a Z mask memory. Such an embodiment may correspond to that described with respect to FIG. 1 above. As such, the Z mask memory may also store a compression level corresponding to the Z information for each pixel block. The representative buffered Z value stored in the Z mask memory may be a truncated Z value in order to reduce the memory required to store the representative buffered Z values for the pixel blocks of the frame.

At step 508 it is determined whether or not the portion of the primitive lies completely behind the image data currently stored for the pixel block to which the portion corresponds.

Thus, in one embodiment, if the front most Z value of the portion lies behind the rear most portion of the data currently stored for the pixel block, the processing of that portion of the primitive will have no effect on the pixel data currently stored in that pixel block (i.e. the image presented to the viewer on a display would not be altered). As such, the portion can be discarded at step 510.

However, if the comparison performed at step 506 is determined at step 508 to indicate that there is no assurance that no part of the portion of the primitive will not have some effect on the pixel data stored for the pixel block, the method proceeds to step 512 where processing of the portion continues. As described earlier, processing of the portion may include generating pixel fragments that are then blended with stored data for the pixel block to which the portion of the primitive corresponds. After blending occurs, if the system supports Z compression, compression of the Z value information for the pixel block is then attempted. Such compression may be used to determine a new representative buffered Z value for the pixel block and a new compression level for the pixel block which can then be stored in the Z mask memory.

By enabling object elements, or primitives, to be processed on a portion-by-portion basis, irrelevant portions of the primitives can be discarded based on Z comparisons such that unnecessary processing operations are avoided. By storing a coarse representation of the current state of the Z values within various pixel blocks, the additional overhead associated with performing such coarse comparisons is reduced. This increases the feasibility of including such systems in video graphics processing systems.

It should be understood that the implementation of variations and modifications of the invention in its various aspects should be apparent to those of ordinary skill in the art, and that the invention is not limited to the specific embodiments described. It is therefore contemplated to cover by the present invention, any and all modifications, variations, or equivalents that fall within the spirit and scope of the basic underlying principles disclosed and claimed herein.

What is claimed is:

1. A method for processing primitives corresponding to a frames comprising:
   separating each primitive into a plurality of portions, wherein each portion of the plurality of portions corresponds to a pixel block of a plurality of pixel blocks, wherein each pixel block of the plurality of pixel blocks includes a portion of a set of pixels that makes up the frame;
   determining a representative Z value for each portion of the primitive;
   comparing the representative Z value for each portion with a representative buffered Z value corresponding to the portion wherein the representative buffered Z value is retrieved from a Z mask memory;
   when the representative Z value for the portion compares favorably with the representative buffered Z value, discarding the portion; and
   when the representative Z value for the portion compares unfavorably with the representative buffered Z value, processing the portion of the primitive.

2. The method of claim 1, wherein determining the representative Z value for each portion of the primitive further comprises utilizing a front most Z value of the primitive as the representative Z value for all portions of the primitive.

3. The method of claim 1, wherein determining the representative Z value for each portion of the primitive further comprises calculating a front most Z value for each portion of the primitive.

4. The method of claim 1, wherein the Z mask memory stores the representative buffered Z value for each pixel block of the frame and also stores a compression level corresponding to Z information for each pixel block.

5. The method of claim 4, wherein processing the portion of the primitive further comprises:
   generating pixel fragments for the portion of the primitive;
   blending the pixel fragments with stored data for a pixel block to which the portion of the primitive corresponds, wherein blending produces Z value information for the pixel block;
   compressing the Z value information such that a new representative buffered Z value and a new compression level, for the pixel block are determined; and
   storing the new representative buffered Z value and the new compression level in the Z mask memory.

6. The method of claim 1, wherein the representative buffered Z value is a Z value corresponding to a rear most pixel block in a rectangular set of pixel blocks determined by vertices of the primitive.

7. The method of claim 1, wherein the representative buffered Z value is a Z value corresponding to a rear most pixel block in a set of pixel blocks that includes pixel blocks that include pixels to which the primitive corresponds.

8. The method of claim 1, wherein the representative buffered Z value is a rear most Z value in a pixel block that corresponds to the portion.

9. The method of claim 1, wherein the representative buffered Z value is a truncated Z value.

10. A video graphics processor, comprising:
    a Z mask memory that stores representative buffered Z values for a plurality of pixel blocks that are included in a frame;
    a Z comparison block operably coupled to the Z mask memory, wherein the Z comparison block receives representative Z information for portions of primitives, wherein the Z comparison block compares the representative Z information for each portion with a representative buffered Z value for a corresponding pixel block, wherein the frame is divided into a plurality of pixel blocks and each portion of each primitive corresponds to a pixel block of the plurality of pixel blocks, wherein the Z comparison block provides an indication based on comparing the representative Z information for each portion with the representative buffered Z value for each corresponding pixel block;
    a raster engine operably coupled to the Z comparison block and operably coupled to receive primitive parameters of primitives, wherein the raster engine processes each primitive in portions, wherein the raster engine determines the representative Z information for each portion and provides the representative Z information for each portion to the Z comparison block, wherein when the Z comparison block indicates a favorable comparison for a portion, the raster engine discards the portion, wherein when the Z comparison block indicates an unfavorable comparison for the portion, the raster engine generates pixel fragments from the primitive parameters for the portion; and
    a render backend block operably coupled to the raster engine, wherein the render backend block blends the pixel fragments received from the raster engine with stored pixel data, wherein the stored pixel data includes stored color data and stored Z data.

11. The video graphics processor of claim 10 further comprises:
   a color buffer operably coupled to the render backend block, wherein the color buffer stores the stored color data;
   a cache operably coupled to the render backend block, wherein the cache stores at least a portion of the stored Z data in an uncompressed format;
   a Z buffer that stores buffered Z data in a compressed format;
   a compression block operably coupled to the cache, the Z buffer, and the Z mask memory, wherein the compression block compresses stored Z data for pixel blocks received from the cache to produce buffered Z data for storage in the Z buffer, wherein the compression block determines a compression level and the representative buffered Z value for each pixel block,
   wherein the Z mask memory stores the compression level and the representative buffered Z value for each pixel block;
   a decompression block operably coupled to the cache and the Z buffer, wherein the decompression block decompresses buffered Z data received from the Z buffer to produce stored Z data in the uncompressed format for storage in the cache; and
   a Z control block operably coupled to the cache, the Z buffer, and the Z mask, wherein the Z control block controls caching of buffered Z data for use by the render backend block based on the compression levels stored in the Z mask memory.

12. The video graphics processor of claim 11, wherein the Z control block, the decompression block, the compression block, the cache, the render backend block, the raster engine, the Z comparison block, and the Z mask memory are included in an integrated circuit.

13. The video graphics processor of claim 12 further comprises a setup engine operably coupled to the raster engine, wherein the setup engine receives the primitives and generates the primitive parameters provided to the raster engine from the primitives.

14. The video graphics system of claim 12, wherein the representative buffered Z value for the corresponding pixel block is a Z value corresponding to a rear most pixel block in a rectangular set of pixel blocks determined by vertices of the primitive.

15. The video graphics system of claim 12, wherein the representative buffered Z value for the corresponding pixel block is a Z value corresponding to a rear most pixel block in a set of pixel blocks that includes pixel blocks that include pixels to which the primitive corresponds.

16. The video graphics system of claim 12, wherein the representative buffered Z value for the corresponding pixel block is a rear most Z value for the corresponding pixel block.

17. The video graphics system of claim 12, wherein the representative Z value for each portion is a front most Z value for the primitive that includes the portion.

18. The video graphics system of claim 12, wherein the representative Z value for each portion is a front most Z value for the portion as calculated based on at least a portion of the primitive parameters for the primitive that includes the portion.

19. A video graphics processor for processing primitives corresponding to a frame, comprising:
   a processing module; and
   memory operably coupled to the processing module, wherein the memory stores operating instructions that, when executed, cause the processing module to perform functions that include:
   separating each primitive into a plurality of portions, wherein each portion of the plurality of portions corresponds to a pixel block of a plurality of pixel blocks, wherein each pixel block of the plurality of pixel blocks includes a portion of a set of pixels that makes up the frame;
   determining a representative Z value for each portion of the primitive such that the processing module determines the representative buffered Z value by retrieving the representative buffered Z value from a Z mask memory;
   comparing the representative Z value for each portion with a representative buffered Z value corresponding to the portion;
   when the representative Z value for the portion compares favorably with the representative buffered Z value, discarding the portion; and
   when the representative Z value for the portion compares unfavorably with the representative buffered Z value, processing the portion of the primitive.

20. The video graphics processor of claim 19, wherein the memory includes operating instructions such that the processing module determines the representative Z value for each portion of the primitive by utilizing a front most Z value of the primitive as the representative Z value for all portions of the primitive.

21. The video graphics processor of claim 19, wherein the memory includes operating instructions such that the processing module determines the representative Z value for each portion of the primitive by calculating a front most Z value for each portion of the primitive.

22. The video graphics processor of claim 19, wherein the Z mask memory stores the representative buffered Z value for each pixel block of the frame and also stores a compression level corresponding to Z information for each pixel block.

23. The video graphics processor of claim 22, wherein the memory includes operating instructions such that the processing module processes the portion of the primitive such that the processing includes:
   generating pixel fragments for the portion of the primitive;
   blending the pixel fragments with stored data for a pixel block to which the portion of the primitive corresponds, wherein blending produces Z value information for the pixel block;
   compressing the Z value information such that a new representative buffered Z value and a new compression level for the pixel block are determined; and
   storing the new representative buffered Z value and the new compression level in the Z mask memory.

24. The video graphics processor of claim 19, wherein the representative buffered Z value is a Z value corresponding to a rear most pixel block in a rectangular set of pixel blocks determined by vertices of the primitive.

25. The video graphics processor of claim 19, wherein the representative buffered Z value is a Z value corresponding to a rear most pixel block in a set of pixel blocks that includes pixel blocks that include pixels to which the primitive corresponds.

26. The video graphics processor of claim 19, wherein the representative buffered Z value is a rear most Z value in a pixel block that corresponds to the portion.

* * * * *